(No Model.)
T. J. NEACY.
SAW MILL DOG.
No. 337,856. Patented Mar. 16, 1886.
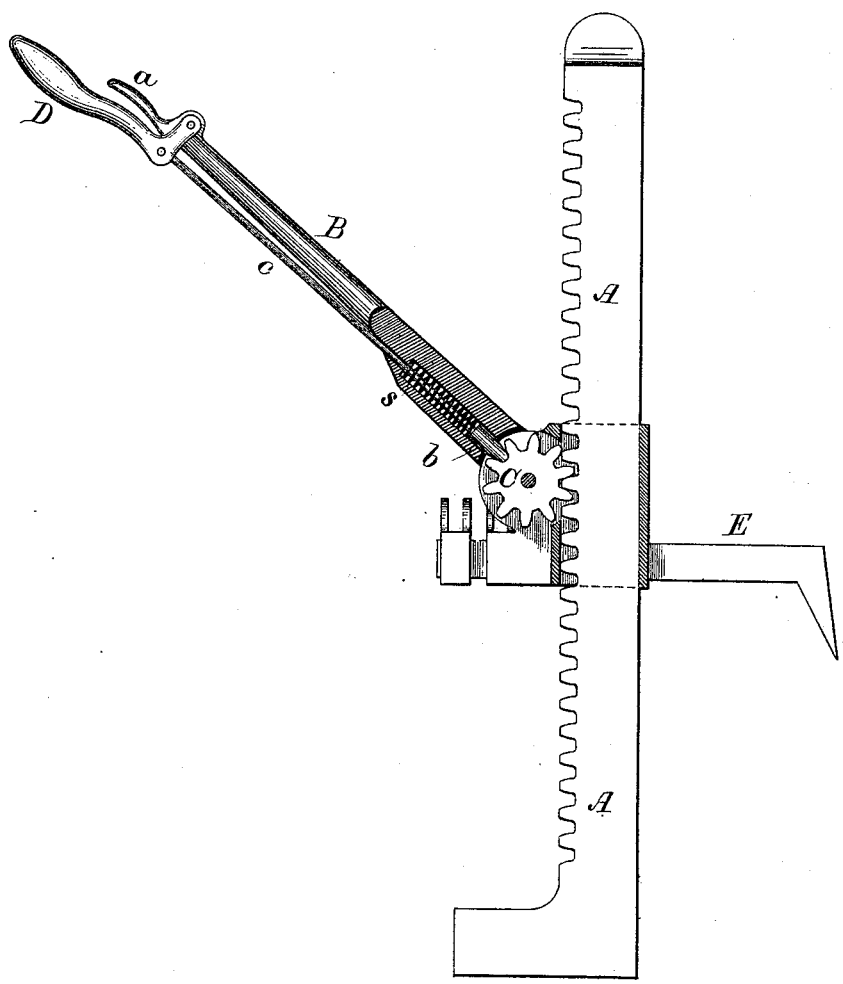
Witnesses:
Chas. L. Goss,
Frank Regensdorf.
Inventor,
Thomas J. Neacy,
per E. H. Bottum
Attorney.

UNITED STATES PATENT OFFICE.

THOMAS J. NEACY, OF MILWAUKEE, WISCONSIN.

SAW-MILL DOG.

SPECIFICATION forming part of Letters Patent No. 337,856, dated March 16, 1886.

Application filed August 27, 1883. Serial No. 104,820. (No model.)

*To all whom it may concern:*

Be it known that I, THOMAS J. NEACY, of Milwaukee, in the county of Milwaukee and State of Wisconsin, have invented certain new and useful Improvements in Saw-Mill Dogs; and I do hereby declare that the following is a full, clear, and exact description of the invention, which will enable others skilled in the art to which it pertains to make and use the same, reference being had to the accompanying drawing, and to the letters of reference marked thereon, which form a part of this specification.

My invention relates to saw-mill dogs; and it consists of an improvement in the device described in Letters Patent of the United States No. 173,451, granted to Elmer C. Dicey, February 15, 1876.

Its object is to prevent the pawl from disengaging itself with the pinion when the lever is pressed down and the dog forced into the log or cant.

As heretofore constructed, the pawl was forced from the notches in the pinion whenever any considerable force was required upon the lever to force the dog into the log. To obviate this difficulty, I make a small auxiliary handle upon the lever at its end, and provide it with a large handle pivoted thereto and connected by a rod with the spring-pawl for the purpose of operating the lever, and at the same time of holding the pawl in engagement with the pinion.

The accompanying drawing represents a side view of my improved dog, with the adjustable sleeve inclosing the pinion and a portion of the lever shown in section to disclose the pinion, spring-pawl, and their connections.

A is the toothed standard of the dog.

F is an adjustable sleeve adapted to be set at any desired point upon standard A by means of the ratchet or pinion C and the spring-pawl $b$. It is provided with the adjustable dog E, whose long shank slides freely therein at right angles to the standard A, and with the pinion C, by means of which the sleeve F is raised or lowered and the dog E operated.

B is a lever pivoted to the sleeve F concentric with pinion C. It is provided with the pawl $b$, which slides in a socket formed therein, and is held in engagement with pinion C by the spiral spring $s$.

Heretofore the lever B has been formed at the end into a handle for the purpose of operating the lever and dog E, and provided on the under side with a small pivoted handle simply for withdrawing the pawl from the pinion C. When so constructed, the pawl $b$ is very likely to be forced from engagement with pinion C by any considerable pressure upon the end of lever B, such as is required to force the dog E into the log or cant. To meet this difficulty, I form the lever B at its end into the small auxiliary handle, $a$, simply to assist in withdrawing the pawl $b$ from ratchet or pinion C, and I provide the lever with a larger handle, D, pivoted thereto in such manner as to extend beyond the handle $a$ and furnish a convenient means of operating said lever. The rod $c$ connects the pawl $b$ with handle D in such a way that when the operator presses down upon said handle to force the dog E into a log or cant the pawl $b$ will be forced more firmly between the teeth of ratchet or pinion C and prevented from being thrown out of engagement therewith.

Where the handle which operates the dog is an auxiliary handle, generally beneath the main lever, as shown in several patents, the operator is compelled to grasp the end of the main lever to move the dog, and whether he grasps the auxiliary handle or not, the tendency is to loosen the catch; but in the present construction, the handle D being the main handle and extending beyond the lever B, the operator will grasp the handle D to move the lever B, and thereby the dog, and the manipulation of the lever by this handle serves to tighten the catch in the pinion.

I claim—

The combination, with a saw-mill dog mounted on a rack-bar and having an operating-pinion, as described, of the lever B, pivoted on the axle of the pinion, catch $b$, engaging said pinion, catch-rod $c$, and bent lever D, pivoted to lever B so as to project beyond the said lever and form an operating hand-grasp beyond the end of the lever, catch-rod $c$ being connected to said bent lever, substantially as described.

In testimony that I claim the foregoing as my own I affix my signature in presence of two witnesses.

THOMAS J. NEACY.

Witnesses:
E. H. BOTTUM,
CHAS. L. GOSS.